(12) United States Patent
Gimpl et al.

(10) Patent No.: US 8,856,785 B2
(45) Date of Patent: Oct. 7, 2014

(54) PREDICTING AND GENERATING A QUANTITY OF IMAGE CLONES

(75) Inventors: David J. Gimpl, Rochester, MN (US); Amey P. Gokhale, Maharashtra (IN); Fahad Mahmood, Uttar Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 13/480,126

(22) Filed: May 24, 2012

(65) Prior Publication Data

US 2013/0315492 A1 Nov. 28, 2013

(51) Int. Cl.
*G06F 9/455* (2006.01)

(52) U.S. Cl.
USPC .......................................... 718/1

(58) Field of Classification Search
None
See application file for complete search history.

(56) References Cited

U.S. PATENT DOCUMENTS

| | | | |
|---|---|---|---|
| 7,856,439 B2 | 12/2010 | Alpern et al. | |
| 8,065,676 B1 * | 11/2011 | Sahai et al. | 718/1 |
| 2007/0258388 A1 * | 11/2007 | Bose | 370/254 |
| 2009/0282404 A1 | 11/2009 | Khandekar et al. | |
| 2010/0070978 A1 * | 3/2010 | Chawla et al. | 718/105 |
| 2010/0100744 A1 | 4/2010 | Dutta | |
| 2010/0122248 A1 | 5/2010 | Robinson et al. | |
| 2010/0235828 A1 | 9/2010 | Nishimura et al. | |
| 2011/0154331 A1 | 6/2011 | Ciano et al. | |
| 2012/0005672 A1 | 1/2012 | Cervantes et al. | |

OTHER PUBLICATIONS

"Rapid, Reliable, and Automated method for Virtual Machine Cloning", ip.com Prior Art Database, Dec. 6, 2005.
"A faster method to deploy application images for virtual machines from a central location to distributed other locations", ip.com Prior Art Database, May 12, 2010.

* cited by examiner

*Primary Examiner* — Emerson Puente
*Assistant Examiner* — Sisley Kim
(74) *Attorney, Agent, or Firm* — Kunzler Law Group (57) ABSTRACT

For predicting and generating a quantity of image clones, a provision module provisions a specified number of a specified image clone to an image pool. The specified number N1 is calculated as N1=N0+CEIL(SE). N0 is a number of the specified image clones provisioned during a previous provisioning operation. SE is a storage estimate. CEIL rounds SE up to a nearest integer. A deployment module deploys a first image clone from the image pool in a subsequent deployment in response to a request.

19 Claims, 5 Drawing Sheets

PREDICTING AND GENERATING A QUANTITY OF IMAGE CLONES

BACKGROUND

1. Field

The subject matter disclosed herein relates to image clones and more particularly relates to predicting and generating a quantity of image clones based on a deploy pattern.

2. Description of the Related Art

Data systems often employ virtual machines to fulfill data processing needs. The virtual machines are often required on short notice, requiring rapid deployment.

BRIEF SUMMARY

An apparatus for predicting and generating a quantity of image clones is disclosed. A computer-readable storage medium stores computer-readable program code executable by a processor. The computer-readable program code comprises a provision module and a deployment module. The provision module provisions a specified number of a specified image clone to an image pool. The specified number N1 is calculated as N1=N0+CEIL(SE). N0 is a number of the specified image clones provisioned during a previous provisioning operation. SE is a storage estimate. CEIL rounds SE up to a nearest integer. A deployment module deploys a first image clone from the image pool in a subsequent deployment in response to a request. A method and computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer-readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer-readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer-readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer-readable program code may be stored and/or propagated on in one or more computer-readable medium(s).

The computer-readable medium may be a tangible computer-readable storage medium storing the computer-readable program code. The computer-readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer-readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer-readable storage medium may be any tangible medium that can contain, and/or store computer-readable program code for use by and/or in connection with an instruction execution system, apparatus, or device.

The computer-readable medium may also be a computer-readable signal medium. A computer-readable signal medium may include a propagated data signal with computer-readable program code embodied therein, for example, in baseband or as part of a carrier wave. Such a propagated signal may take any of a variety of forms, including, but not limited to, electrical, electro-magnetic, magnetic, optical, or any suitable combination thereof. A computer-readable signal medium may be any computer-readable medium that is not a computer-readable storage medium and that can communicate, propagate, or transport computer-readable program code for use by or in connection with an instruction execution system, apparatus, or device. Computer-readable program code embodied on a computer-readable signal medium may be transmitted using any appropriate medium, including but not limited to wireline, optical fiber, Radio Frequency (RF), or the like, or any suitable combination of the foregoing In one embodiment, the computer-readable medium may comprise a combination of one or more computer-readable storage mediums and one or more computer-readable signal mediums. For example, computer-readable program code may be both propagated as an electro-magnetic signal through a fiber optic cable for execution by a processor and stored on RAM storage device for execution by the processor.

Computer-readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer-readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer-readable program code. The computer-readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer-readable program code may also be stored in a computer-readable medium that can direct a computer, other programmable data processing apparatus, or other devices to function in a particular manner, such that the instructions stored in the computer-readable medium produce an article of manufacture including instructions which implement the function/act specified in the schematic flowchart diagrams and/or schematic block diagrams block or blocks.

The computer-readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer-readable program code.

The description of elements in each figure may refer to elements of proceeding figures. Like numbers refer to like elements in all figures, including alternate embodiments of like elements.

Figure 1:
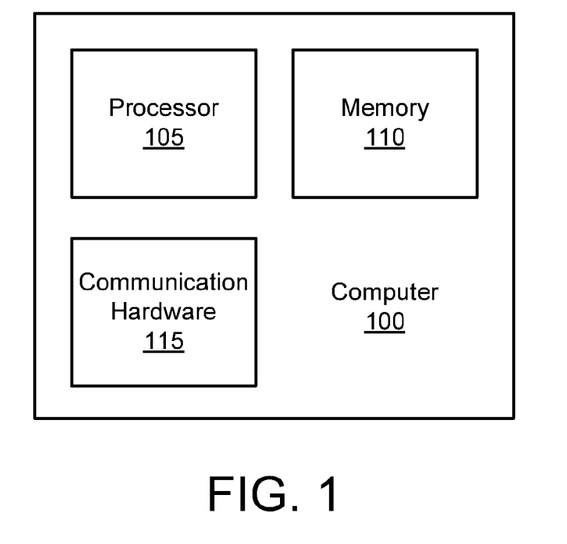
FIG. 1 is a schematic block diagram illustrating one embodiment of a computer.

FIG. 1 is a schematic block diagram illustrating one embodiment of a computer 100. The computer 150 includes a processor 105, a memory 110, and communication hardware 115. The memory 110 may store computer-readable program code. The memory 110 may be a semiconductor storage device, a hard disk drive, and optical storage device, and/or combinations thereof. The processor 105 may execute the computer-readable program code. The computer 100 may communicate with other devices through the communication hardware 115.

In one embodiment, the computer-readable program code comprises a hypervisor. The hypervisor may allow multiple virtual machines to execute on the processor 105. Each virtual machine may function as a distinct computer as is well known to those skilled in the art.

Figure 2:
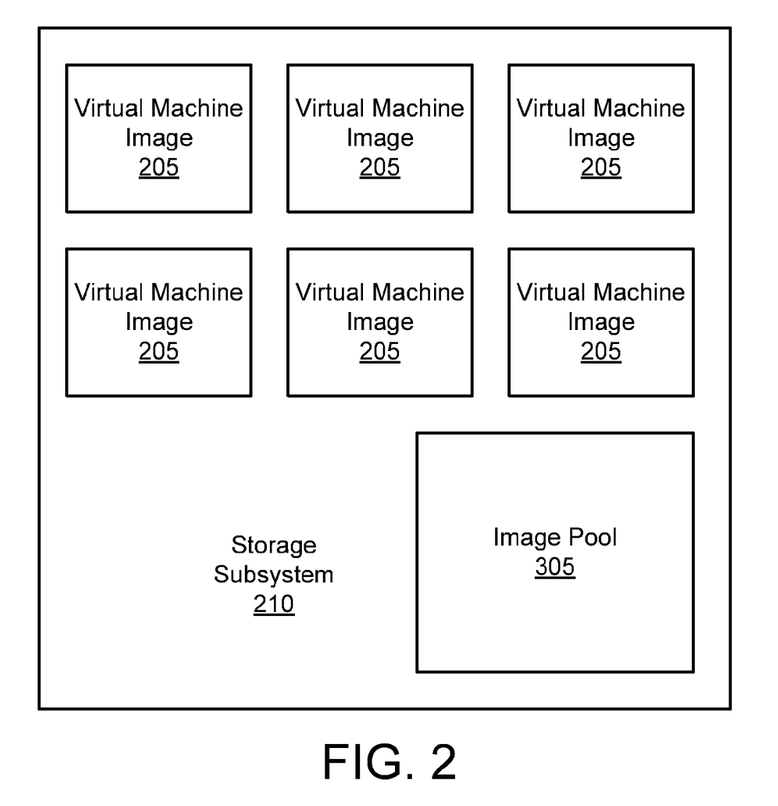
FIG. 2 is a schematic block diagram illustrating one embodiment of a storage subsystem.

FIG. 2 is a schematic block diagram illustrating one embodiment of a storage subsystem 210. The storage subsystem 210 may comprise a storage device such as a hard disk drive, and optical storage device, a micromechanical storage device, a holographic storage device, a semiconductor storage device, or the like. In one embodiment, the storage subsystem 210 is a Storage Area Network (SAN). The storage subsystem 210 stores a plurality of virtual machine images 205. Each virtual machine image 205 may execute as a virtual machine on the computer 100.

Virtual machine images 205 may be added or deployed to the storage subsystem 210 as needed. To accelerate the deployment of a virtual machine image 205, the virtual machine image 205 may be created as an image clone in anticipation of deployment and stored in an image pool 305.

The image pool 305 will be described in more detail hereafter. When the virtual machine image 205 is needed, the image clone may be deployed from the image pool 305 as a new virtual machine image 205. In one embodiment, the image clone is migrated from a logical volume of the image pool 305 to another logical volume of the storage subsystem 205 when deployed.

However, if too many image clones are created in the image pool 305 in anticipation of deployment as virtual machine images 205, the resources of the storage subsystem 210 are reduced. The embodiments described herein generate image clones to satisfy deployment requirements without excessively burdening the storage subsystem 210 with unneeded image clones.

Figure 3:
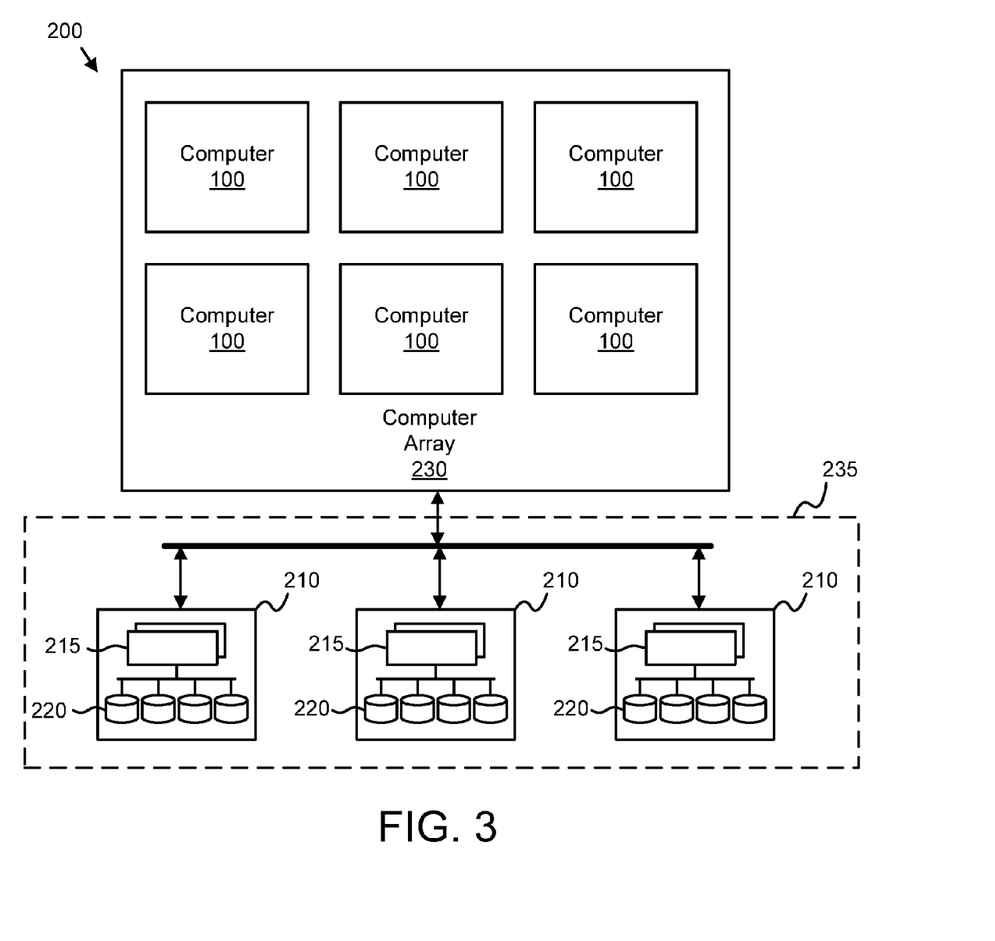
FIG. 3 is a schematic block diagram illustrating one embodiment of a data system.

FIG. 3 is a schematic block diagram illustrating one embodiment of a data system 200. The data system 200 includes a computer array 230 and a SAN 235. The computer array 230 includes a plurality of computers 100. In one embodiment, the computer array 230 is one or more blade servers and each of the computers 100 may be disposed on one or more server blades.

The SAN 235 may include one or more storage subsystems 210. Each storage subsystem 210 may include one or more controllers 215. The controllers 215 may manage one or more hard disk drives 220. The hard disk drives 220 may store the virtual machine images 205 and the clone images of the image pool 305. In one embodiment, the hard disk drives 220 are organized into one or more logical volumes. Portions of each logical volume may reside on one or more hard disk drives 220.

Figure 4:
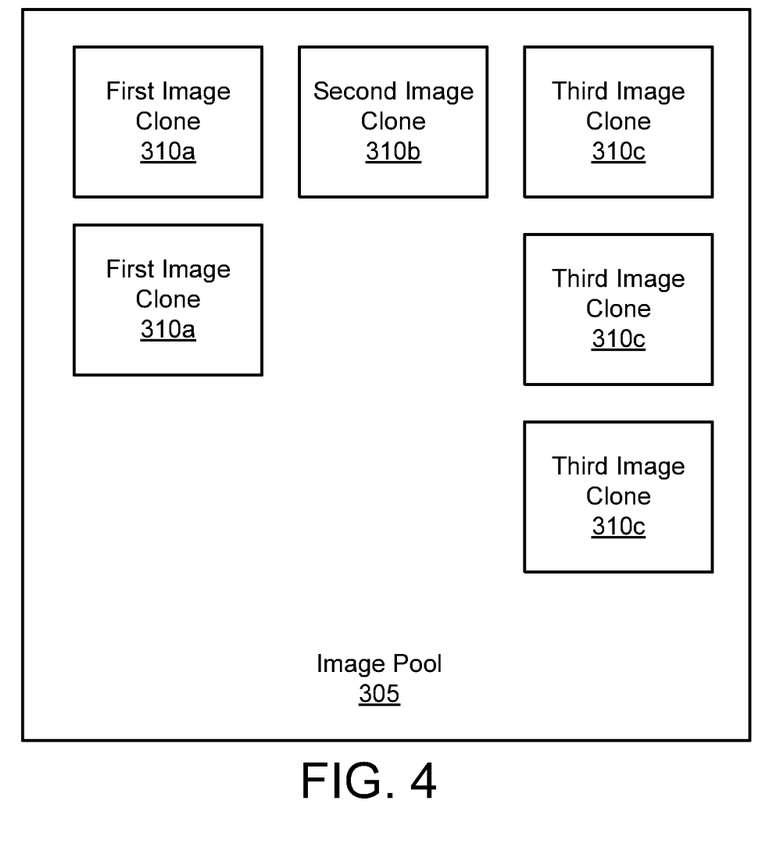
FIG. 4 is a schematic block diagram illustrating one embodiment of an image pool.

FIG. 4 is a schematic block diagram illustrating one embodiment of an image pool 305. The image pool 305 is the image pool 305 of FIG. 2. The image pool 305 may comprise one or more logical volumes on a storage subsystem 210. The image pool 305 may store one or more instances of one or more image clones 310. In the depicted embodiment, the image pool 305 stores two instances of first image clones 310*a*, one instance of a second image clone 310*b*, and three instances of third image clone 310*c*. The image clones 310 are created in anticipation of being deployed as virtual machine images 205.

Figure 5:
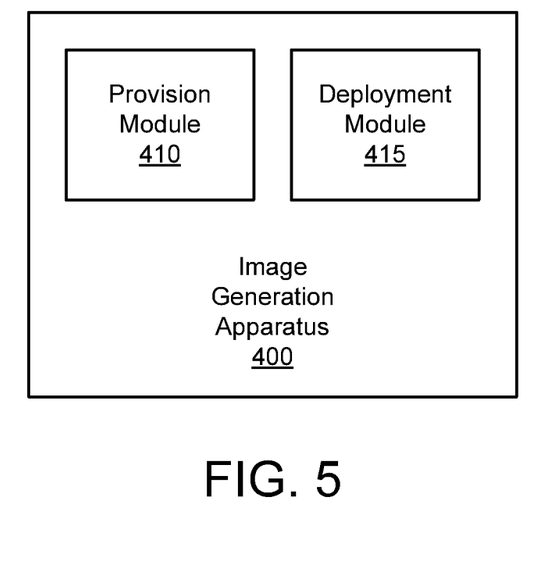
FIG. 5 is a schematic block diagram illustrating one embodiment of an image generation apparatus.

FIG. 5 is a schematic block diagram illustrating one embodiment of an image generation apparatus 400. The apparatus 400 may be embodied in the computer 100 of FIG. 1. The apparatus 400 includes a provision module 410 and a deployment module 415. The provision module 410 and the deployment module 415 may each be embodied in computer-readable program code. The computer-readable program code may be stored on a computer-readable storage medium such as the memory 110 and executed by the processor 205.

The provision module 410 may provision a specified number of a specified image clone 310 to the image pool 305 as will be described hereafter. The deployment module 415 may deploy an image clone from the image pool 305 as will be described hereafter.

Figure 6:
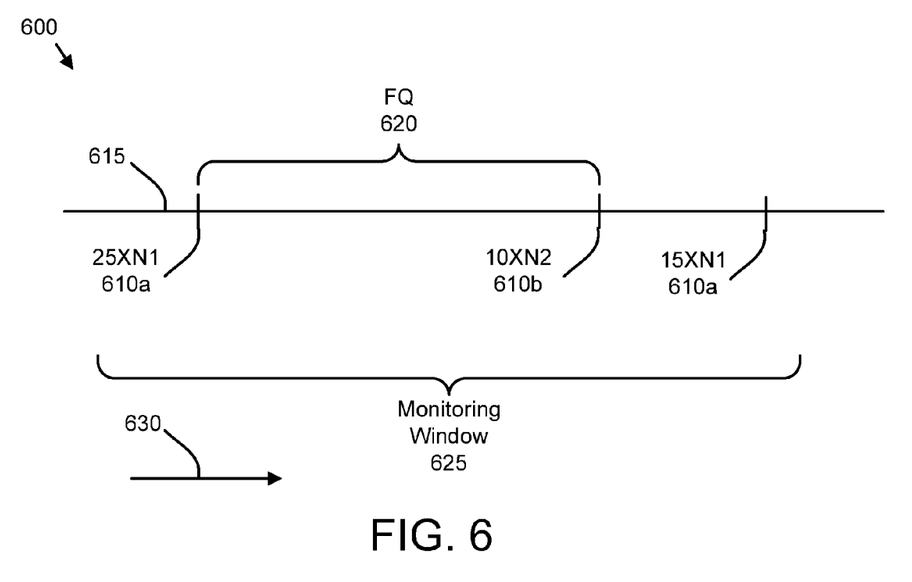
FIG. 6 is a schematic diagram illustrating one embodiment of image deployment.

FIG. 6 is a schematic diagram illustrating one embodiment of image deployment 600. A timeline 615 is shown with time advancing in a left right direction as indicated by the arrow 630. Image clones 310 deployments 610 are shown at various times along the timeline 615, with an arrow 630 indicating the direction of time. In one embodiment, the image clones 310 are deployed 610 as requested.

In the depicted embodiment, 25 simultaneous deploys of instances of the first image clones 310*a* are deployed 610*a*, followed by 10 simultaneous deploys of instances the second image clones 310*b* being deployed 610*b*, followed by 15 simultaneous deploys of instances of the first image clone 310*a* being deployed 610*c*. The time interval between deployments FQ 620 is shown between the first deployment 610*a* and the second deployment 610*b*.

In one embodiment, the provision module 410 monitors the deployment 610 during a monitoring window 625. In one embodiment, the monitoring window 625 is a specified number of deployments 610 of any of the image clones 310. For example, in the depicted embodiment the monitoring window is three (3) deployments 610 of image clones 310. Alternatively, the monitoring window 625 is a specified time interval.

Figure 7:
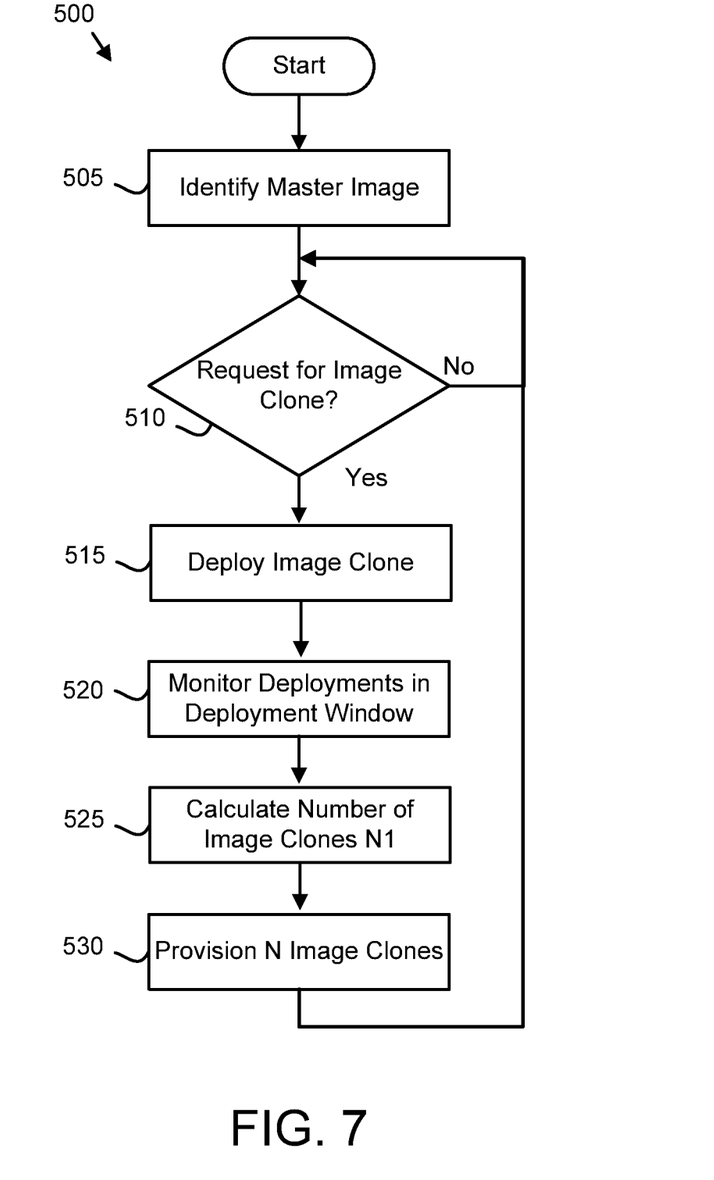
FIG. 7 is a schematic flow chart diagram illustrating one embodiment of a clone image prediction and generation method.

FIG. 7 is a schematic flow chart diagram illustrating one embodiment of a clone image prediction and generation method 700. The method 700 may perform the functions of the apparatus and systems of FIGS. 1-6. In one embodiment, the method 700 is performed by computer-readable program code stored on a computer-readable storage medium such as the memory 110 and executed by a processor 105.

The method 500 starts, and in one embodiment the provision module 410 identifies 505 one or more master images of virtual machines 205. The master image may be an exemplary virtual machine image 205. The master image may be imported. For example, a master image may be copied from a storage device. Alternatively, the master image may be captured from an active virtual machine image 205. In one embodiment, the master image is defined by an administrator.

The deployment module 415 may determine 510 if a request is received to deploy an image clone 305 from the image pool 305. The request may be received from a data system management program, an administrator, or the like. If the request is not received, the deployment module 415 continues to monitor for a request. If the request if received, the deployment module 415 deploys 515 the requested image clone 310 from the image pool 305 for use in the data system 200.

In one embodiment, the provision module 410 monitors 520 deployments 610 of image clones 310 from the image pool 305. The provision module 410 may monitor 520 each deployment and record statistics about each deployment.

The provision module 410 may employ a listener to intercept commands to the storage subsystem 210. The listener may intercept commands at one or more specified port addresses. The provision module 410 may further parse the commands for indications of a deployment of an image clone 310. For example, the provision module 410 may interpret commands directing the migration of the image clone 310 from the image pool 305 as a deployment of the image clone 310. The provision module 410 may further parse the intercepted commands for information about each deployment.

In an alternate embodiment, the provision module 410 may receive notifications of the deployment of the image clone 310. For example, each time the processor 105 issues one or more commands deploying the image clone 310, the processor 105 may also issue a notification to the provision module 410. The notification may be an encoded packet identifying the type of image clone 310 and a number of simultaneous deploys of the image clone 310. The encoded packet may further include a time stamp.

The provision module 410 may monitor 520 deployments during the monitoring window 625. In one embodiment, the provision module 410 records each request for an image clone 310 during the monitoring window 625. For example, the provision module 410 may build a table summing the total deployments of a type of image clone 310, the simultaneous deployments of the type of image clone 310, the number of image clones deployed in each simultaneous deployment SD of the type of image clone 310, a time stamp, a time interval FQ between deployments of image clones 310, a time to deploy the specified image clone TD, a number of deployments ND of the specified image clone 310, a number of deploys NI with a specified image clone 310, a time required for storage operations SO, and a number of distinct image clone types TI in the image pool 305.

In one embodiment, the monitoring window 625 is a specified number of deployments 610. For example, the provision module 410 may specify that the monitoring window 625 is the interval during which 100 image clones 310 are deployed.

In one embodiment, the monitoring window 625 is a specified time interval. The specified time interval may be in the range of five minutes to one hour. Alternatively, the specified time interval may be in the range of one to ten hours.

The provision module 410 further calculates 525 a number N1 of specified image clones 310 with which to provision the image pool 305 during a subsequent provisioning operation for the image pool 305. In one embodiment, the number N1 of the specified image clones 310 is calculated using equation 1, where N0 is a number of the specified image clones provisioned during a previous provisioning operation, SE is a storage estimate, and CEIL rounds SE up to a nearest integer.

$$N1 = N0 + CEIL(SE) \qquad \text{Equation 1}$$

In a certain embodiment, N0 is set to zero if there are no previous provisioning operations. In one embodiment, the storage estimate SE is calculated using Equation 2, where PI is a probability of deploying the specified image clone 310 in the subsequent deployment 610 and SD is the number of simultaneous deploys of the specified image clone 310.

$$SE = PI*SD \qquad \text{Equation 2}$$

In an alternate embodiment, the storage estimate SE is calculated using Equation 3, where PI is the probability of deploying the specified image clone in the subsequent deployment of equation 2, SD is a number of simultaneous deploys of the specified image clone of equation 2, FQ is the time interval between two deployments of the specified image clone, and TD is the time to deploy the specified image clone 310.

$$SE = PI*SD*(1+TD/FQ) \qquad \text{Equation 3}$$

In one embodiment, the probability of deploying the specified image clone PI is calculated using equation 4, where NI is a number of deployments 610 of the specified image clone 310 during a specified monitor interval 625. In addition, ND is a number of deployments 610 of any image clone 310 that is monitored during the specified monitor interval 625. ND may be a fixed number. In one embodiment, ND may be a number of deployments 610 for the monitor interval 625. Continuing the example of FIG. 6, the number of the deployments 610 for the monitor interval 625 may be three (3) deployments 610.

$$PI = NI/ND \qquad \text{Equation 4}$$

In one embodiment, the number of deployments of the specified image clone ND is calculated using equation 5, where TI is the number of distinct image clone types. For example, the image pool 305 of FIG. 4 depicts three distinct image clone types. An image clone type may be a WINDOWS® operating system image type, a Linux image type, or the like.

$$ND = TI + 1 \qquad \text{Equation 5}$$

In one embodiment, the number of the specified image clones provisioned during the previous provisioning operation N0 is set to equal zero if a time interval between two deployments of the specified image clone FQ is greater than the time to deploy the specified image clone TD. For example, if the time interval between deployments FQ is 300 seconds and a time to deploy an image clone 305 is 250 seconds, then the number of specified image clones provisioned during the previous provisioning operation N0 is set to zero.

In one embodiment, the time to deploy the specified image clone TD is calculated using equation 6, where CT is a time to clone the specified image clone by copying a master image to the image pool 305 and SO is a time for a storage operation to migrate the resulting image clone 305. For example, if a time to clone an image clone 310 from a master image is 200 seconds and a time for a storage operation SO is 50 seconds, then the time to deploy the specified image clone TD is calculated as 250 seconds.

$$TD = CT + SO \qquad \text{Equation 6}$$

In one embodiment, CT is set to zero if an image clone copy time is less than a copy threshold. The copy threshold may be in the range of 100-400 seconds. For example, if cloning an image clone 305 requires 35 seconds and the copy threshold is 50 seconds, then CT is set to zero.

In one embodiment, the provision module 410 calculates 525 a number N1 of specified image clones 310 for a plurality of image clone types. For example, N1 may be calculated for both WINDOWS® and Linux operating system image clones 305.

The provision module 410 further provisions 520 the specified number of image clones N in the image pool 305. The provision module 410 may provision 520 the image clones 310 by copying the master image for the image clone 310 to the image pool 305. The provision module 410 may continue to determine 510 if a request for an image clone 510 is received.

By calculating the number N1 of specified image clones 310 with which to provision the image pool 305, sufficient image clones 310 are available for deployment from the image pool 305 without using excessive storage subsystem 210 resources.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a non-transitory computer-readable storage medium storing computer-readable program code executable by a processor, the computer-readable program code comprising:
a provision module provisioning a specified number of a specified image clone to an image pool, wherein the specified number N1 is calculated as N1=N0+CEIL (SE), N0 is a number of the specified image clones provisioned during a previous provisioning operation, SE is a storage estimate calculated as SE=PI*SD, where PI is a probability of deploying the specified image clone in a subsequent deployment, SD is a number of simultaneous deploys of the specified image clone, and CEIL rounds SE up to a nearest integer; and
a deployment module deploys a first image clone from the image pool in a subsequent deployment in response to a request.

2. The apparatus of claim 1, wherein PI is calculated as PI=NI/ND, where NI is a number of deployments of the specified image clone and ND is a number of deployments of the specified image clone during a monitor interval.

3. The apparatus of claim 2, wherein the number of deployments of the specified
image clone during a monitor interval ND is calculated as ND=TI+1, where TI is a number of distinct image clone types.

4. The apparatus of claim 3, wherein the number of the specified image clones
provisioned during the previous provisioning operation NO equals zero if a time interval between two deployments of the specified image clone FQ is greater than a time to deploy the specified image clone TD.

5. The apparatus of claim 4, wherein the time to deploy the specified image clone
TD is calculated as TD=CT+SO where CT is a time to clone the specified image clone, with CT is set to zero if an image clone copy time is less than a copy threshold, and SO is a time for a storage operation.

6. The apparatus of claim 1, wherein the storage estimate SE is calculated as SE=PI*SD*(I+TD/FQ), where PI is a probability of deploying the specified image clone in the subsequent deployment, SD is a number of simultaneous deploys of the specified image clone, FQ is a time interval between two deployments of the specified image clone, and TD is a time to deploy the specified image clone.

7. A method for predicting and generating a quantity of image clones comprising:
provisioning a specified number of a specified image clone to an image pool, wherein the specified number N1 is calculated as N1=NO+CEIL(SE), NO is a number of the specified image clones provisioned during a previous provisioning operation, SE is a storage estimate calculated as SE=PI*SD, where PI is a probability of deploying the specified image clone in a subsequent deployment, SD is a number of simultaneous deploys of the specified image clone, and CEIL rounds SE up to a nearest integer; and
deploying a first image clone from the pool in a subsequent deployment in response to a request.

8. The method of claim 7, wherein PI is calculated as PI=NI/ND where NI is a number of deployments of the specified image clone and ND is a number of deployments of the specified image clone during a monitor interval.

9. The method of claim 8, wherein the number of deployments of the specified image clone during a monitor interval ND is calculated as ND=TI+1, where TI is a number of distinct image clone types.

10. The method of claim 7, wherein the number of the specified image clones provisioned during the previous provisioning operation NO equals zero if a time interval between two deployments of the specified image clone FQ is greater than a time to deploy the specified image clone TD.

11. The method of claim 10, wherein the time to deploy the specified image clone TD is calculated as TD=CT+SO where CT is a time to clone the specified image clone and SO is a time for a storage operation.

12. The method of claim 11, wherein CT is set to zero if an image clone copy time is less than a copy threshold.

13. The method of claim 7, wherein the storage estimate SE is calculated as SE=PI*SD*(I+TD/FQ), where PI is a probability of deploying the specified image clone in the subsequent deployment, SD is a number of simultaneous deploys of the specified image clone, FQ is a time interval between two deployments of the specified image clone, and TD is a time to deploy the specified image clone.

14. The method of claim 13, wherein the number of the specified image clones provisioned during the previous provisioning operation NO equals zero if a time interval between two deployments of the specified image clone FQ is greater than a time to deploy the specified image clone TD.

15. A computer program product for predicting and generating a quantity of image clones, the computer program product comprising:
a non-transitory computer-readable storage medium having computer-readable program code embodied therein, the computer-readable program code configured to:
provision a specified number of a specified image clone to an image pool, wherein the specified number N1 is calculated as N1=NO+CEIL(SE), NO is a number of the specified image clones provisioned during a previous provisioning operation, SE is a storage estimate calculated as SE=PI*SD, where PI is a probability of deploying the specified image clone in a subsequent deployment, SD is a number of simultaneous deploys of the specified image clone, and CEIL rounds SE up to a nearest integer; and
deploy a first image clone from the pool in a subsequent deployment in response to a request.

16. The computer program product of claim 15, wherein PI is calculated as PI=NI/ND where NI is a number of deployments of the specified image clone and ND is a number of deployments of the specified image clone during a monitor interval.

17. The computer program product of claim 16, wherein the number of deployments of the specified image clone during a monitor interval ND is calculated as ND=TI+1, where TI is a number of distinct image clone types.

18. The computer program product of claim 17, wherein the number of the specified image clones provisioned during the previous provisioning operation NO equals zero if a time interval between two deployments of the specified image clone FQ is greater than a time to deploy the specified image clone TD.

19. The computer program product of claim 15, wherein the storage estimate SE is calculated as SE=PI*SD*(I+TD/FQ), where PI is a probability of deploying the specified image clone in the subsequent deployment, SD is a number of simultaneous deploys of the specified image clone, FQ is a time interval between two deployments of the specified image clone, and TD is a time to deploy the specified image clone.

* * * * *